June 10, 1930.  G. S. EBLE  1,762,771
PIPE FITTING
Filed Sept. 3, 1926
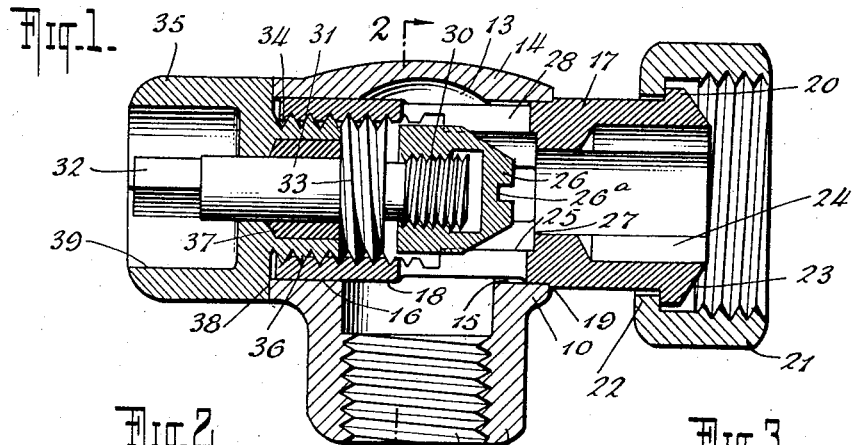
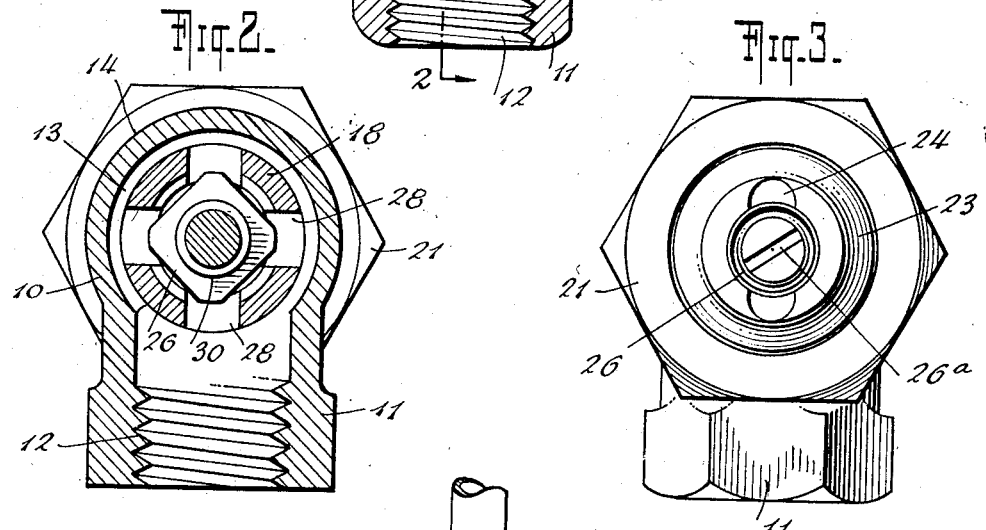
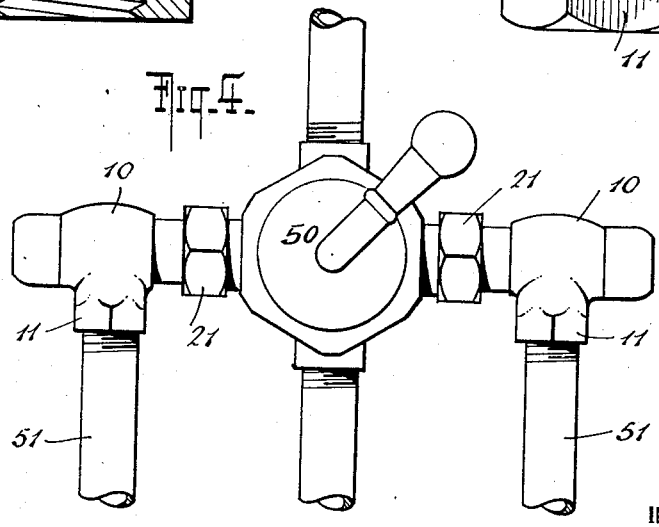
INVENTOR
GROVER S. EBLE
BY
Rotha, Kehlenbeck & Farley
ATTORNEYS Patented June 10, 1930

1,762,771

UNITED STATES PATENT OFFICE

GROVER S. EBLE, OF BELLE HARBOR, NEW YORK

PIPE FITTING

Application filed September 3, 1926. Serial No. 133,312.

This invention relates to pipe fittings and valves and has for its principal object to provide as a new article of manufacture and, as a unitary structure, a combined union, L and valve.

Heretofore, it has not been known to construct as a unitary structure either a combined L and union or a combined shut-off cock, union and L. As in many plumbing installations, it is not only desirable, but it is the common practice to employ a union, a shut-off cock and an L in supply lines, it has been necessary to use three separate fittings. The use of these separate fittings necessitates the cutting and threading of many separate lengths of pipes and also the fitting of not less than six threaded joints (two to each fitting) in each line in which the L, union and shut-off are used, thereby involving not only considerable installation costs, but also danger of leakage at each joint after the installation is completed.

By constructing a fitting in accordance with the principles disclosed in this application, it becomes possible to replace the three separate fittings above referred to with a single fitting, thereby decreasing the number of lengths of pipe heretofore employed, decreasing the amount of thread cutting involved and reducing the number of joints from six to two, thus lowering the installation costs and diminishing the possibility of leakage after the installation has been completed.

The objects of the invention outlined above and other objects such as simplicity and sturdiness of construction, the provision of a fitting of a neat and attractive appearance, the construction of a fitting, the manufacturing costs, of which will be relatively small, will appear more fully from the following more detailed description and by reference to the accompanying drawing forming a part hereof, in which Fig. 1 is a central longitudinal section through a combined fitting and valve, constructed in accordance with the principle of my invention; Fig. 2 is a section on the line 2—2 of Fig. 1; Fig. 3 is an elevation as seen from the right hand side of Fig. 1, and Fig. 4 is an elevation of a plumbing installation showing the manner in which my improved fitting is connected in a supply line.

As shown in the drawings, the main body or casing 10 of the fitting has a laterally projecting boss or branch 11, which in the example illustrated, is shown as provided with the interior screw threads 12, but it will be obvious, however, that if desired, the exterior of this branch 11 may be screw-threaded to construct the branch as a male fitting instead of a female fitting. The bore of the branch 11 communicates with an enlarged central portion 13 of the bore of the cylindrical part 14 of the casing 10, this enlarged portion preferably being made in the casting of the casing. Each end of the bore of the casing 10 is machined as indicated by the numerals 15 and 16 to receive with a neat frictional fit a sleeve 17. The sleeve 17 has a portion of its length co-extensive with the length of the cylindrical part 14 of the casing 10, turned, as indicated by the reference character 18, to fit neatly within the machined parts 15 and 16 of said casing and to provide a small shoulder 19 which serves as a stop against which the sleeve is seated when the parts are assembled. That end of the sleeve 17 adjacent to the shoulder 19 is enlarged as indicated by the reference character 20 to provide a stop for the union nut 21, the inwardly extending flange 22 of which encircles the sleeve 17 loosely, in accordance with the usual construction of unions. The end 20 of the sleeve is machined to provide a union joint surface 23, which is shaped and ground to form with the usual cooperating union member a fluid tight joint. The enlarged end of the sleeve 17 has its bore provided with a pair of longitudinally extending kerfs 24 which serve to receive any suitable tool for preventing rotation of the sleeve during the assembling of the fitting in a manner which will be readily understood.

That portion of the sleeve 17 which is adapted to fit within the cylindrical part 14 of the casing 10 is counterbored as indicated by the reference character 25 to receive the valve plug 26. The inner end of the valve plug 26 is turned to provide a conical seating surface which is adapted to be brought into contact with the inner periphery 27 of the shoulder formed by the counterbore 25 and to form therewith a fluid tight joint when the plug is screwed home, and said end is also provided with a kerf 26ª to receive a screw driver.

In the particular constructional example illustrated, the main body of the plug 26 is rectangular in cross section, the dimensions of the rectangle being such that the corners thereof will extend into the slots 28 cut at diametrically opposite points in the side wall of the sleeve 17, there being as shown in Fig. 2, four of such slots into which the four corners of the rectangular plug are received, to prevent relative rotation between the plug and sleeve after the parts have been assembled. The slots 28 also serve to provide communication between the branch 11 and the interior of the sleeve.

That end of the plug 26 opposite to the conical seating surface thereof is drilled and threaded with a left hand thread to receive the reduced similarly threaded end 30 of the valve rod 31. The other end of the valve rod is squared as indicated by the reference character 32 to permit a key to be engaged with the valve rod for actuating the valve. Between its ends the valve rod is provided with the enlarged screw threaded portion 33 which is adapted to engage within the interiorly screw threaded end 34 of the sleeve 17. The screw threads 33 and 34 are right hand threads.

A cap or bonnet 35 has one end thereof reduced and screw threaded as indicated by the reference character 36 to engage within the interior screw threads 34 of the sleeve 17. This end of the cap 35 is provided with a counterbore in which the packing or gasket 37 is adapted to be received. The packing is preferably in the form of a comparatively long sleeve of rubber or other suitable material, adapted to fit snugly within the counterbore and about the valve rod 31. The other end of the bonnet 35 is enlarged to provide a shoulder 38 adapted to seat against the end of the cylindrical portion 14 of the valve casing 10 and said enlarged end is broached out to provide a square recess 39 in which a key or wrench may be engaged for screwing the bonnet tightly upon the valve casing. The shoulder 38 formed by the enlarged portion of the bonnet may be provided with an annular recess in which a gasket or washer may be received. Ordinarily, however, the use of a gasket will not be required, because the contacting surfaces of the shoulder and end wall of the cylindrical portion 14 are machined so that a fluid tight metal-to-metal joint is formed when the bonnet is screwed home.

The manner in which the device is assembled is as follows: The valve plug 26 is screwed upon the reduced threaded end 30 of the valve rod 31, and the enlarged screw threaded portion 33 of the valve rod is engaged with the screw threaded inner end 34 of the sleeve 17. Rotation of the valve rod in a clockwise direction will cause the rod with the plug carried thereby to be screwed into the sleeve. As the rod is screwed into the sleeve, a screw driver is inserted into the other end of the sleeve and engaged with the kerf 26ª of the plug 26 to hold the plug in a position such that its corners will enter the slots 28 of the sleeve. A union nut 21 is then placed over the sleeve, and the sleeve, with the nut mounted thereon, and the valve rod and plug contained therein is inserted into the bore of the cylindrical part 14 of the casing 10 and is thrust home until the shoulder 19 is brought into contact with the end wall of the casing. The gasket 37 having been placed within the counterbore of the bonnet, the bonnet 35 now has its screw threaded end engaged with the screw threads 34, and the bonnet is screwed home until the shoulder formed by its enlarged end engages with the other end wall of the casing.

Owing to the fact that the sleeve 17 engages with a snug frictional fit with the bores 15 and 16 of the casing 10, there is but little danger of any water leaking or seeping between the sleeve and casing. The shoulder 19 of the sleeve, however, forms a tight metal-to-metal joint with one of the machined end walls of the casing 10, while the valve bonnet 35 forms a similar joint with the other end wall of the casing, and the screwing of the valve bonnet home draws both of these metal-to-metal joints into tight engagement with said end walls, so that no leakage at all occurs between the casing and sleeve and its associated parts. It will be noted that the inner end of packing 37 is open to the interior of the casing and is flush with the inner end of the counterbore and its length is greater than its inner diameter, therefore the long-sleeve-like washer 37 prevents leakage about the valve rod 31 much more effectually than the usual relatively short washer or gasket, because water pressure existing within the valve casing is directed against the inner end wall of the packing 37 and tends to compress it in a longitudinal direction, this longitudinal compression of the resilient mass of material which forms the packing obviously tends to increase its transverse dimensions and to squeeze the packing against both the circumference of the valve rod and the inner circumference of the counterbore of the valve bonnet. The outer end of the bonnet 35, and the casing 10 immediately adjacent thereto, are preferably turned to the same dimension, thereby giving the fitting a neat and attractive appearance.

The manner in which the valve is operated will be readily understood, the screw threads 30 and 33 being of opposite hands, that is to say, the screw thread 30 is left hand and the screw threads 33, 34 are right hand, a differential movement of the valve plug 26 occurs when the valve rod 31 is rotated. As the valve rod 31 is rotated in a direction such that the threads 33 and 34 will cause the rod to be moved inwardly, the valve plug 26 which is carried upon the inner end of the valve rod will also be moved inwardly towards its seat. In addition to this inward movement of the plug, it will receive an additional inward movement, because of the fact that it is held from rotation by the engagement of its corners within the slots 28 of the sleeve, and as the valve rod is rotated in the manner above described, the left hand threads 30 will unscrew and thereby tend to cause the plug to be moved outwardly relatively to the rod 31. The pitch of the screws 30 and 33 is preferably so selected that a single revolution of the valve rod will move the plug a distance such that the valve will be moved from its full open to its full closed position by such single revolution. The gasket or packing 37 preferably fits a trifle more snugly within the counterbore of the bonnet than about the valve rod so that the packing will remain stationary relatively to the bonnet with its outer end flush with the end of the counterbore during the longitudinal movement of the valve rod.

The showing in Fig. 4 illustrates how the fitting is assembled in an installation. In this view, the union nut 21 is shown engaged with a cooperating union part of a mixing valve 50, and a supply pipe length 51 is shown in engagement with the interiorly screw threaded branch 11 of the valve casing.

It will be noted that as the valve seat for the plug 26 is formed upon the sleeve 17, that as the threads 34 for the valve rod are formed in said sleeve, and that such threads also serve for the attachment of the bonnet 35, the provision of the detachable sleeve 17 not only enables the device to be constructed as a combined L and union but also enables a valve construction to be obtained in which any of the parts subjected to wear in the use of the valve may be readily replaced when necessary without disturbing any of the permanent pipe thread connections of the installation.

The construction of the elbow is such that either branch may be the inlet or pressure side because the valve 26 will function equally as well whether it is closed against the pressure of the fluid or with, that is, in the same direction as, said pressure.

It will also be noted that the enlarged, broached or hollowed out end of the bonnet 35 forms a lockshield for the valve stem, whereby the valve is of the type commonly known as concealed shut-off valves. As heretofore constructed, in valves of such type, the lock-shield which serves to conceal the valve stem has always been made as a separate member screwed on to the bonnet, which member encases the stuffing box and valve stem and must be removed whenever it is necessary to obtain access to the stuffing box. With the construction herein disclosed the lock shield is not only integral with the bonnet, but the latter also performs the function of a stuffing box, a single integral part thus performing the functions formerly performed by three separate members. As a result the construction and assembly costs of the device herein disclosed are materially less than the prior art constructions.

I claim:

1. A combination L, union and valve comprising a casing having a laterally extending screw-threaded branch, with which a pipe line is adapted to be connected, a sleeve mounted within said casing, said sleeve having a portion thereof projecting outwardly of said casing and provided with a union joint surface, a union nut swivelly mounted upon the projecting portion of said sleeve, a valve plug mounted within said sleeve and a bonnet detachably connected with said sleeve for permitting the removal of said valve plug and for securing said sleeve within said casing.

2. A combination pipe fitting comprising a casing having a substantially cylindrical bore with an enlargement between its ends, and a laterally extending branch to which a pipe line is adapted to be connected in communication with said enlargement, a sleeve mounted within said casing having an enlarged end projecting outwardly of said casing, said enlarged end being provided with a union joint surface, a union nut swivelly mounted on said enlarged end and means cooperating with said sleeve and said casing to secure said sleeve within said casing.

3. A combination L, union and valve comprising a casing having a substantially cylindrical bore with an enlargement between its ends and a laterally extending branch to which a pipe line is adapted to be connected, a sleeve mounted within said casing and having a plurality of orifices for furnishing communication between its interior and said enlargement, said sleeve also being provided with an enlarged end, having a union joint surface thereon, projecting outwardly beyond said casing, a union nut swivelly mounted on said enlarged end, a valve plug mounted within said sleeve, a valve bonnet cooperating with said sleeve and casing and detachable therefrom, and a valve rod connected with said valve plug and passing through said bonnet.

4. A combination pipe fitting comprising a substantially cylindrical casing having a laterally extending branch to which a pipe line is adapted to be connected, a sleeve mounted within said casing and having a plurality of elongated slots therein, through which communication between said branch and enlargement is established, a valve plug mounted within said sleeve and having portions thereof projecting into said slots to hold said plug against rotation, and a valve rod having threaded engagement with said plug and with said sleeve, the threaded engagement of said rod with said plug being of opposite hand to the threaded engagement of said rod with said sleeve whereby a longitudinal movement of said plug due to the rotation of said rod is effected by the action of both of said threads.

5. In a combined pipe fitting and valve, a casing, having a cylindrical bore, a sleeve fitting snugly but detachably within said bore, said sleeve being provided with a valve seat and a screw-threaded portion and having longitudinally extending openings in its side walls, a valve plug to engage said seat mounted within said sleeve, said valve plug having side portions which extend in slidable engagement with said openings to prevent relative rotation between said plug and sleeve, and a valve rod in screw-threaded engagement with said valve plug and with said screw-threaded portion of said sleeve, the threaded engagement of said valve rod with said valve plug being of opposite hand from its engagement with said sleeve, whereby longitudinal movement of said plug produced by rotation of said rod is the resultant of two component movements produced by the two threaded portions of said valve rod.

6. A combined pipe fitting and valve as set forth in claim 5 in which a valve bonnet is also engaged with the screw-threaded portion of said sleeve and secures said sleeve to said casing.

7. In a device of the character set forth, a casing having a through bore with machined bearing surfaces at each end of said bore, the ends of said casing adjacent to said bore being machined, a sleeve fitted snugly but detachably within said casing and having a machined periphery for engagement with said machined bearing surfaces, said sleeve projecting outwardly beyond one end of said casing, and terminating in an enlarged union joint surface, said sleeve having a machined shoulder on its projecting end for engagement with one of the machined ends of said casing, a cap in screw-threaded engagement with said sleeve, said cap also having a machined shoulder for engagement with the other machined end of said casing and serving when screwed home to hold said sleeve securely within said casing and to cause both said shoulders to engage tightly with the screw-threaded ends of said casing and form therewith fluid tight joints, a union nut loosely mounted on the projecting end of said sleeve and confined thereon between the enlarged end of said sleeve and said casing.

8. In a device of the character set forth, a casing, a valve bonnet secured thereto having a bearing surface for a valve rod, a counterbore in said bonnet at the inner end of said bearing surface, a valve rod passing through said bonnet, and a packing consisting of a sleeve of resilient material the length of which is greater than its inner diameter, fitted within said counterbore, encircling said valve rod, and having its inner end open to the interior of said casing whereby fluid pressure within said casing will be exerted longitudinally upon said sleeve to cause its longitudinal dimension to be decreased and its transverse dimensions increased thus squeezing said sleeve into fluid tight engagement with said valve rod and counterbore.

9. In a device of the character set forth, a casing, a valve bonnet secured thereto having a bearing surface for a valve rod, a counterbore in said bonnet at the inner end of said bearing surface, a valve rod passing through said bonnet, and a packing consisting of a sleeve of resilient material the length of which is at least as great as its inner diameter, fitted within said counterbore, encircling said valve rod, and having its inner end open to the interior of said casing whereby fluid pressure within said casing will be exerted longitudinally upon said sleeve to cause its longitudinal dimension to be decreased and its transverse dimensions increased thus squeezing said sleeve into fluid tight engagement with said valve rod and counterbore.

10. In a combined pipe fitting and valve, a casing having a cylindrical bore, a sleeve fitting snugly but detachably within said bore, said sleeve being provided with a valve seat and an interior screw-threaded portion, a valve block to engage said seat mounted within said sleeve, a valve rod connected with said valve block and in threaded engagement with said screw-threaded portion of said sleeve, and a valve bonnet also engaged with the screw-threaded portion of said sleeve.

In testimony whereof I have hereunto set my hand.

GROVER S. EBLE.